US012495069B2

(12) United States Patent
Black et al.

(10) Patent No.: US 12,495,069 B2
(45) Date of Patent: Dec. 9, 2025

(54) METHOD FOR VERIFYING CONFIGURATIONS OF SECURITY TECHNOLOGIES DEPLOYED ON A COMPUTER NETWORK

(71) Applicant: AttackIQ, Inc., San Diego, CA (US)

(72) Inventors: Andrew William Black, San Diego, CA (US); Tin Shing Tam, Anaheim, CA (US)

(73) Assignee: AttackIQ, Inc., San Diego, CA (US)

( * ) Notice: Subject to any disclaimer, the term of this patent is extended or adjusted under 35 U.S.C. 154(b) by 362 days.

(21) Appl. No.: 17/091,560

(22) Filed: Nov. 6, 2020

(65) Prior Publication Data

US 2021/0320945 A1   Oct. 14, 2021

Related U.S. Application Data

(60) Provisional application No. 63/008,445, filed on Apr. 10, 2020.

(51) Int. Cl.
*H04L 9/40* (2022.01)
*H04L 43/106* (2022.01)

(52) U.S. Cl.
CPC ........ *H04L 63/1466* (2013.01); *H04L 43/106* (2013.01); *H04L 63/1416* (2013.01); *H04L 63/1433* (2013.01)

(58) Field of Classification Search
CPC ............. H04L 41/0816; H04L 41/0866; H04L 43/106; H04L 63/1416; H04L 63/1433; H04L 63/1466
See application file for complete search history.

(56) References Cited

U.S. PATENT DOCUMENTS

| | | | |
|---|---|---|---|
| 11,522,898 B1* | 12/2022 | Belton, Jr. | ............... G06N 5/02 |
| 2007/0113281 A1* | 5/2007 | Leach | .................... G06Q 40/08 |
| | | | 726/22 |
| 2015/0128274 A1* | 5/2015 | Giokas | .................. H04L 51/212 |
| | | | 726/23 |
| 2016/0085954 A1* | 3/2016 | Tunnell | ............... H04L 63/0853 |
| | | | 726/7 |
| 2016/0301705 A1* | 10/2016 | Higbee | .................... H04L 51/42 |
| 2019/0104022 A1* | 4/2019 | Power | ..................... H04L 43/20 |

(Continued)

*Primary Examiner* — Daniel B Potratz
*Assistant Examiner* — Matthias Habtegeorgis
(74) *Attorney, Agent, or Firm* — Run8 Patent Group, LLC; Peter Miller; Brian T. Chew

(57) ABSTRACT

One variation of a method for verifying configurations of security technologies deployed on a computer network includes: deploying a phase—within an attack validation scenario analogous to a network security threat and associated with a target response type—for execution by an asset on the computer network during a phase window; during the polling window following the phase window, polling a log of a security technology deployed on the network for a sequence of events associated with the target asset; correlation events, in the sequence of events, with the phase based on proximities of event timestamps to the phase window; and, in response to a difference between an event type of a first event correlated with the phase and the target response type, generating a prompt to reconfigure the security technology to respond to behaviors analogous to the phase, on the computer network, according to the target response type.

22 Claims, 5 Drawing Sheets

(56) References Cited

U.S. PATENT DOCUMENTS

| | | | |
|---|---|---|---|
| 2019/0222604 A1* | 7/2019 | Vaidya | H04L 63/1416 |
| 2020/0177612 A1* | 6/2020 | Kras | H04L 63/1433 |
| 2020/0184026 A1* | 6/2020 | Espino | G06F 16/9024 |
| 2021/0149385 A1* | 5/2021 | Cohen | G08B 29/02 |
| 2022/0232033 A1* | 7/2022 | Vaidya | G06F 30/20 |

* cited by examiner

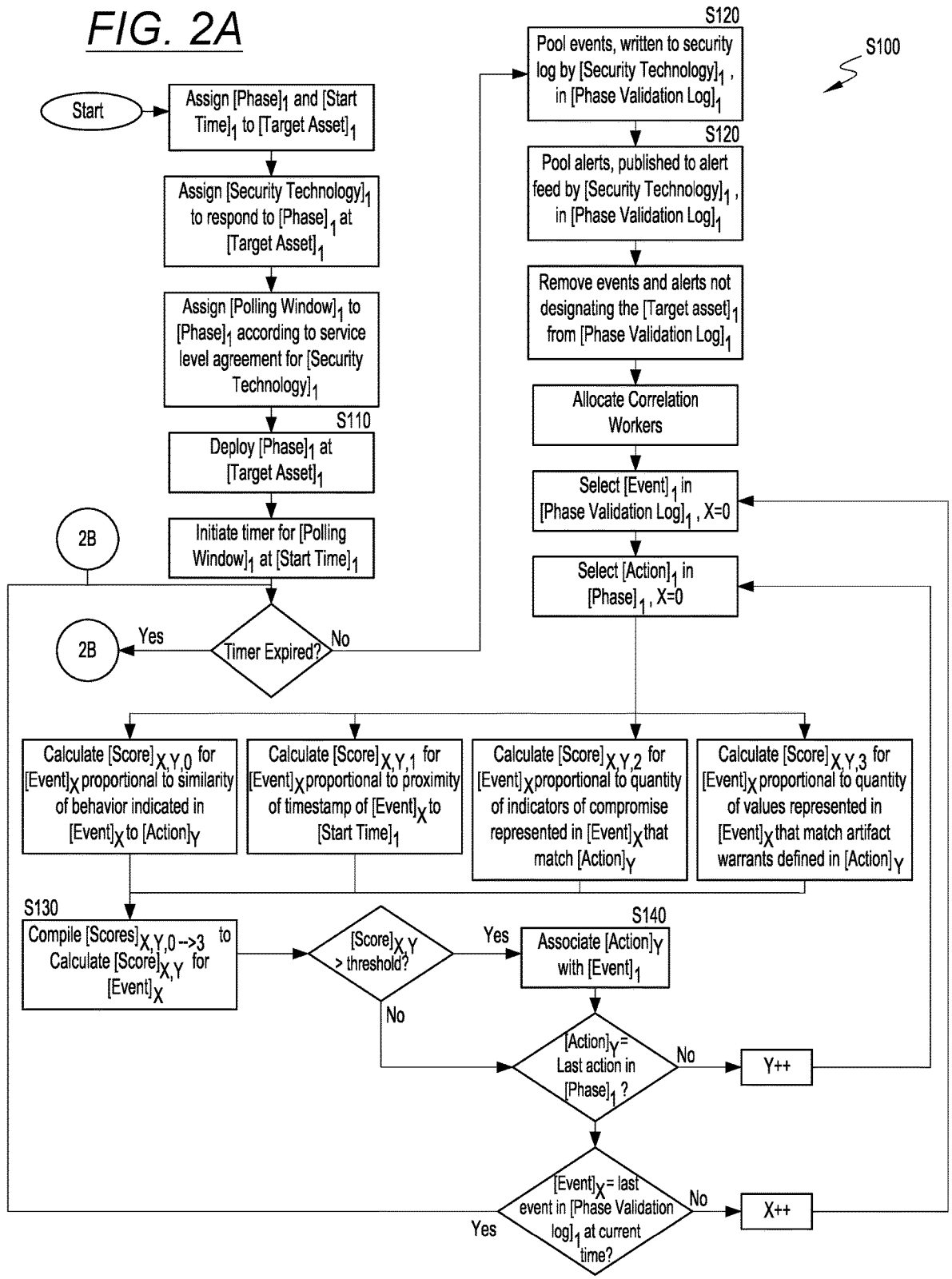

METHOD FOR VERIFYING CONFIGURATIONS OF SECURITY TECHNOLOGIES DEPLOYED ON A COMPUTER NETWORK

CROSS-REFERENCE TO RELATED APPLICATIONS

This application claims the benefit of U.S. Provisional Application No. 63/008,445, filed on 10 Apr. 2020, which is incorporated in its entirety by this reference.

TECHNICAL FIELD

This invention relates generally to the field of internet security and more specifically to a new and useful method for verifying configurations of security technologies deployed on a computer network in the field of internet security.

BRIEF DESCRIPTION OF THE FIGURES

FIGS. 2A and 2B are flowchart representations of one variation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
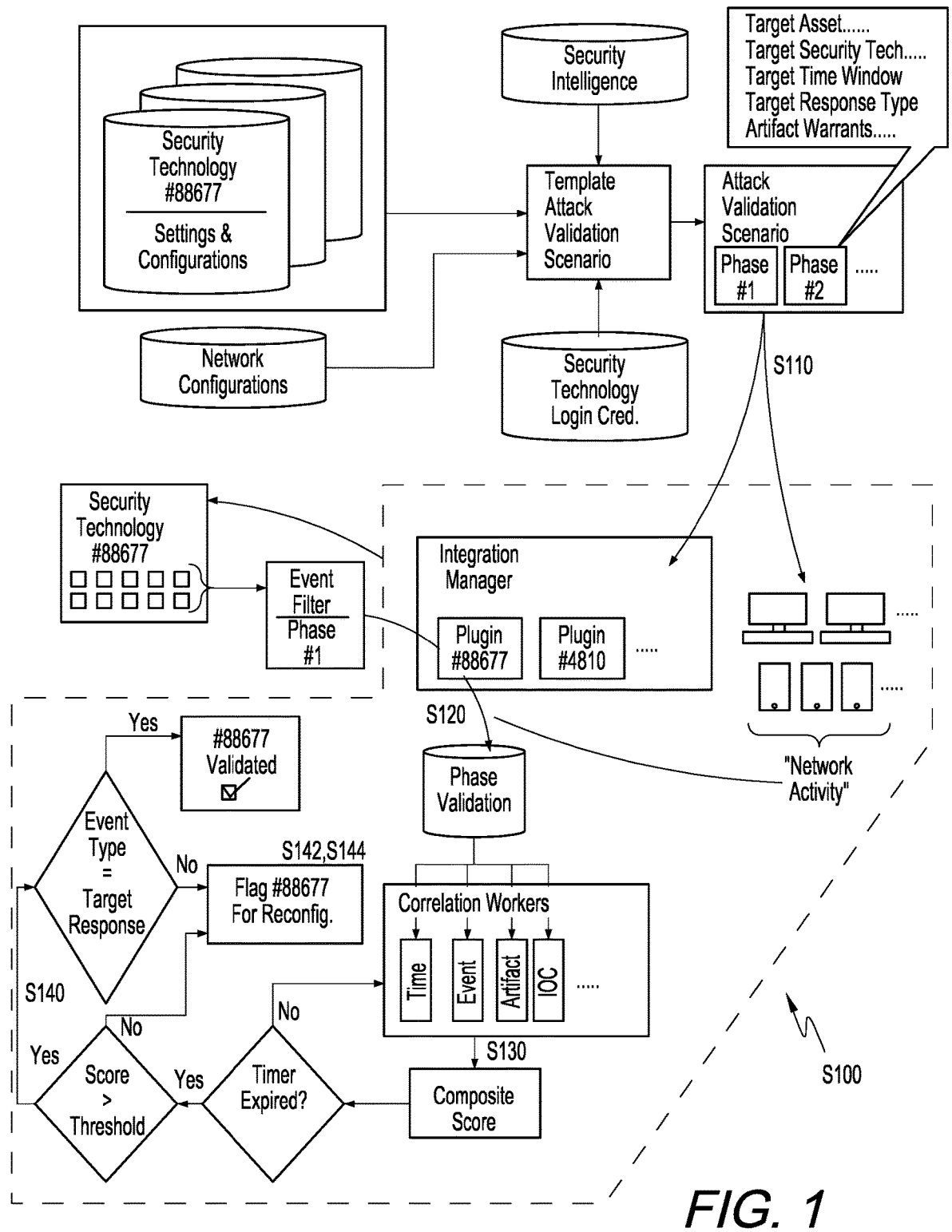
FIG. 1 is a flowchart representation of a method.

As shown in FIG. 1, a method S100 for verifying configurations of security technologies deployed on a computer network includes: deploying a phase, within an attack validation scenario analogous to a network security threat, to a target asset on a computer network at a first time in Block S110, the phase specifying a set of phase parameters including a polling window, a target security technology within a set of security technologies active on the network, and a target response type; within the polling window following the first time, pooling security event data logged by the target security technology in a phase validation docket in Block S120; calculating a correlation score based on correlations between security event data in the phase validation docket and the set of phase parameters in Block S130; in response to the correlation score exceeding a threshold score, confirming logging of the phase by the target security technology in Block S140; in response to confirming logging of the phase by the target security technology and in response to a difference between the target response type and security event data in the phase validation docket, flagging the target security technology for failing to fulfill the target response type in Block S142; and, in response to the correlation score falling below the threshold score, flagging the target security technology for failing to log the phase in Block S144.

Figure 2B:
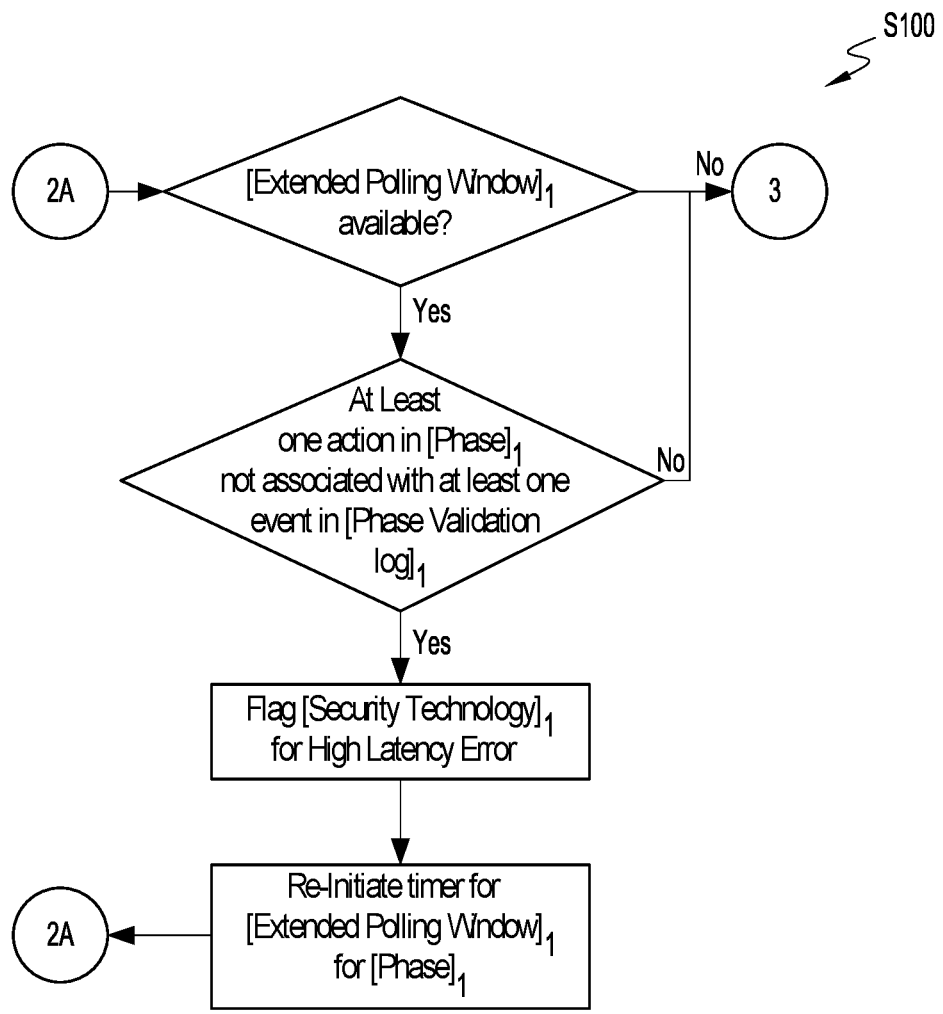
Figure 3A:
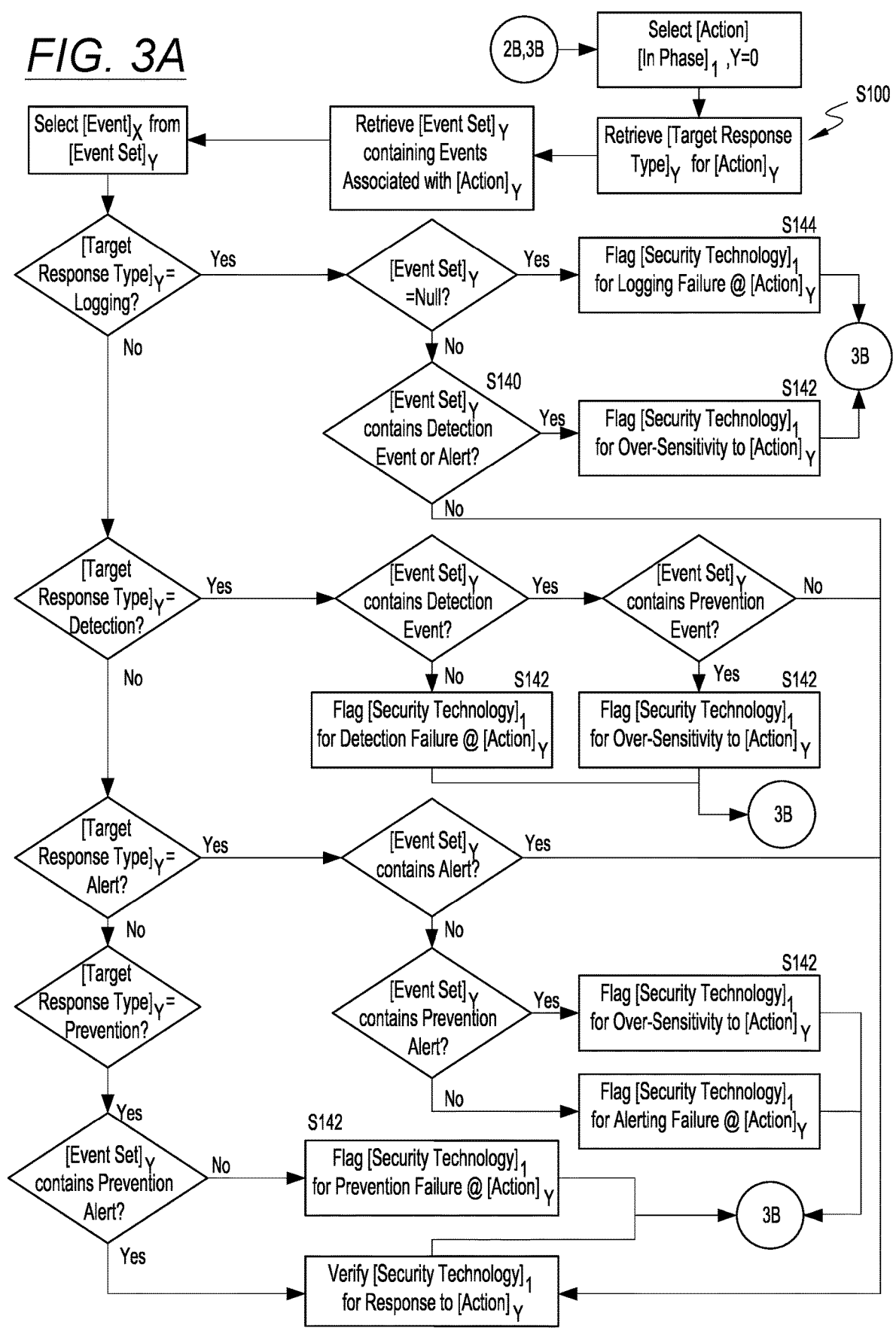
FIGS. 3A and 3B are flowchart representations of one variation of the method.

One variation of the method S100 shown in FIGS. 2A, 2B, 3A, an 3B includes: deploying a phase, within an attack validation scenario analogous to a network security threat, to a target asset on a computer network In Block S110, the phase associated with a polling window and a target response type and executed by the target asset during a phase window; during the polling window following the phase window, polling a log of a security technology deployed on the network for a sequence of events associated with the target asset in Block S120; calculating correlation scores for events, in the sequence of events, based on proximities of timestamps of events, in the sequence of events, to the phase window in Block S130; in response to a first correlation score of a first event, in the sequence of events, exceeding a threshold score, confirming logging of the phase by the security technology in Block S140; and, in response to confirming logging of the phase by the security technology and in response to a difference between a first event type of the first event and the target response type of the phase, generating a prompt to reconfigure the security technology to respond to behaviors analogous to the phase, on the computer network, according to the target response type in Block S142.

Another variation of the method S100 includes: deploying a phase, within an attack validation scenario analogous to a network security threat, to a target asset on a computer network In Block S110, the phase associated with a polling window, designating a target alert response type, and executed by the target asset during a phase window; during the polling window following the phase window, polling an alert feed for a sequence of alerts associated with the target asset and published by a security technology deployed on the network in Block S120; and calculating correlation scores for alerts, in the sequence of alerts, based on proximities of timestamps of alerts, in the sequence of alerts, to the phase window in Block S130. This variation of the method S100 also includes, based on the target alert response type: in response to a first correlation score of a first alert, in the sequence of alerts, exceeding a threshold score, confirming configuration of the security technology to generate alerts responsive to behaviors analogous to the phase on the computer network in Block S140; and, in response to absence of at least one alert, in the sequence of alerts, exceeding the threshold score, generating a prompt to reconfigure the security technology to generate alerts responsive to behaviors analogous to the phase on the computer network in Block S142.

2. Applications

Generally, Blocks of the method S100 can be executed by a computer system—such as including an integration manager and correlation workers—within a computer network to automatically verify control configurations of security technologies deployed on the network. In particular, the computer system can: load an attack validation scenario defining a set of benign phases that, when executed, trigger benign network behaviors that mimic malicious attack behaviors; assign detection, prevention, or alerting responsibilities for phases of the attack validation scenario to particular security technologies active on the network; deploy these phases of the attack validation scenario to assets on the network; pool security events written to logs of these security technologies and alerts published to an alert feed(s) by these security technologies; correlate these pooled security events and alerts (or "events") to known parameters and characteristics of phases of the attack validation scenario; confirm whether these security technologies properly logged, detected, prevented, or alerted on their assigned phases of the attack validation scenario based on these correlations; and then flag any security technology that failed to log, detect, prevent, or alert—as planned (or scheduled, expected)—on its assigned phase(s).

More specifically, an attack validation scenario can be populated with a set of phases, wherein each phase is deployed to an target asset on a computer network and initiates a sequence of actions—by the target asset—that a particular security technology active on the network is contracted or otherwise expected to log, detect, prevent, and/or alert. A security technology active on the network may therefore detect, prevent, and/or alert on actions initiated by a particular phase within the attack validation scenario as contracted or expected if this security technology is properly configured; and vice versa.

For example, if the security technology is properly connected to and integrated with a sentinel installed on the computer network, the security technology log may contain a log event representing an action executed by the target asset according to the phase; and vice versa. Similarly, if the security technology is tuned to interpret actions within the phase as anomalous behaviors or similar to a known security threat, the security technology may flag actions within the phase and write detection events for these actions to the log; and vice versa. Similarly, if the security technology is tuned to prevent behaviors similar to actions within the phase, the security technology may prevent an action within the phase or the phase more generally—such as by quarantining the target asset—and write a prevention event for the action or phase to the log. Furthermore, if the security technology is connected to an alert feed and tuned to publish alerts for anomalous behaviors and behaviors similar to actions within the phase, the security technology may publish an alert—for an action within the phase or for the phase more generally—to the alert feed.

Therefore, logging, detection, and prevention events written to the log and alerts published to the alert feed by the security technology during or following execution of the phase by the target asset may predict the security technology's response to behaviors within an analogous attack on the computer network. If these logging, detection, and prevention events and alerts align with expected (or planned, scheduled, contracted) responses by the security technology, the computer system can validate proper configuration of this security technology to timely log, detect, prevent, and/or alert on network behaviors executed by during an analogous phase of a malicious attack on the network. However, differences between expected responses by the security technology and actual these logging, detection, and prevention events and alerts by the security technology during execution of the phase may indicate that this security technology is not properly configured or not configured according to an expectation (e.g., of security personnel) to timely log, detect, prevent, and/or alert on network behaviors within an analogous phase of a malicious attack on the network. Accordingly, the computer system can: confirm configuration of the security technology; or prompt security personnel to investigate and reconfigure this security technology, respectively.

Therefore, the computer system can execute Blocks of the method S100 to validate the configuration of a single security technology to write logging, detection, and preventing events and to publish alerts as planned responsive to particular actions within a phase of an attack validation scenario that is representative of a network attack. Similarly, the computer system can execute Blocks of the method S100: to verify that at least one security technology deployed on the network is configured to log, detect, prevent, or alert on each phase of the attack validation scenario; to verify that a suite of security technologies collectively prevented or alerted on an complete attack validation scenario containing multiple phases; and/or to verify configuration of security technologies throughout the computer network (i.e., at different nodes, devices, or device types across the computer network).

2.1 Example: Phase

Therefore, the computer system can generate an attack validation scenario containing a set of phases that, in aggregate, trigger assets on the computer network to execution a sequence of actions analogous to an attack, a security threat, or other risky activity on the computer network. The computer system can also define phase parameters for each phase in the attack validation scenario. For example, the computer system can assign a target asset on the network to execute a particular phase. The computer system can also specify a target security technology—deployed to the network—to respond to the actions prescribed by the particular phase, such as based on contractual obligations in a service level agreement for the target security technology to respond to actions prescribed by the particular phase. The computer system can further specifying a polling window for the target security technology to respond to these actions within the particular phase, such as based on a time limit for detecting actions prescribed by the phase, as outlined in the service level agreement for the target security technology. The computer system can also designate a target response type (e.g., log, detect, prevent, or alert) by the target security technology responsive to actions prescribed by the phase, such as based on a response type outlined in the service level agreement for the target security technology. Furthermore, the computer system can specify phase behavior artifacts for distinguishing network actions triggered by the phase from network behaviors initiated by other, unrelated activities on the network.

The computer system can then: queue and deploy a phase to its assigned asset on the network; pool log, detection, and prevention events published to event log by the target security technology over the polling window following deployment of the phase to the target asset; pool alerts (or "alert events") from this event log or from a separate alert feed connected to the target security technology during this polling window; filter these events and alerts by known characteristics and parameters of the phase; and calculate strengths of correlations of these filtered events and alerts to these known phase parameters and characteristics—such as across asset, time, and artifact domains.

The computer system can then associate each event and alert—with a correlation score exceeding a threshold score—with the phase. The computer system can then: verify that the security technology logged the phase if at least one log, detection, or prevention event correlated with the phase is published to the log by the security technology during the polling window; verify that the security technology detected the phase if at least one detection or prevention event correlated with the phase is published to the log by the security technology during the polling window; verify that the security technology prevented the phase if at least one prevention event correlated with the phase is published to the log by the security technology during the polling window; and verify that the security technology alerted on the phase if at least alert correlated with the phase is published to the alert feed by the security technology during the polling window. The computer system can then verify confirm whether such logging, detection, prevention, or alerting response(s) conform to the target response type assigned to this phase.

Thus, if the computer system confirms that the target security technology logged the phase of the attack validation scenario and confirms that any detection event, prevention event, or alert executed by the target security technology matches the target response type assigned to this phase, the computer system can confirm that the target security technology is currently configured to fulfill obligations and liabilities outlined in the service level agreement and/or other settings of the target security technology. Otherwise, the computer system can flag the target security technology for inspection and reconfiguration, such as: if the target security technology fails to log actions prescribed by the phase (i.e., log failure); if the target security technology fails to interpret actions prescribed by the phase at significant and to flag these actions in a detection event contrary to a target detection-type response assigned to the phase (i.e., detection failure); if the target security technology fails to generate an alert to investigate significant actions prescribed by the phase and to publish this alert to the alert feed contrary to a target alert-type response assigned to the phase (i.e., an alerting failure); or if the target security technology fails to quarantine the target asset automatically or otherwise prevent actions—analogous to an attack or data loss event on the computer network—within the phase contrary to a target prevention-type response assigned to the phase (i.e., a prevention failure).

The computer system can also: quantify latency of the target security technology to log, detect, prevent, and/or alert on the phase based on a known deployment time of the phase and a known sequence of actions prescribed by the phase; and then communicate this latency to security personnel affiliated with the network, thereby enabling these security personnel to not only confirm that the target security technology is properly configured but also to perceive the target security technology's response time for network behaviors and attacks analogous to this phase of the attack validation scenario.

The computer system can implement similar methods and techniques to verify logging, detection, prevention, or alerting responses to individual actions or subsets of actions prescribed by the phase. For example, the computer system can: calculate strengths of correlations of filtered events and alerts read from the security technology log and the alert feed to known phase parameters and characteristics of individual actions or groups of actions within the phase; and link each event and alert—associated with a correlation score exceeding a threshold score—with a particular subset of actions within the phase. The computer system can then: verify whether the target response types assigned to individual actions or subsets of actions within the phase match log, detection, prevention, or alert types of corresponding events and alerts thus correlated with these individual actions or subsets of actions; or otherwise, flag the target security technology for failing to log, detect, prevent, or alert on individual actions or subsets of actions executed by the target asset according to the phase.

2.2 Example: Attack Validation Scenario and Multiple Phases

The computer system can repeat this process to deploy multiple phases within the attack validation scenario across various assets on the network and to verify that a singular security technology or a suite of different security technologies deployed on the network are properly configured to log, detect, prevent, and/or alert on each phase (or on individual actions or subsets of actions prescribed by these phases) in the attack validation scenario. The computer system can then: flag each security technology that fails to achieve its designated response type for a corresponding phase of the attack validation scenario for inspection and reconfiguration; identify security technologies that successfully responded to their corresponding phases of the attack validation scenario; characterize redundancy across multiple security technologies to concurrently respond to phases of the attack validation scenario; and characterize latency of these security technologies to respond to their corresponding phases of the attack validation scenario; etc.

The computer system can therefore execute Blocks of the method S100 to: verify that security technologies deployed on the network are currently configured to achieve their designated responses to (e.g., log, detect, prevent, or alert on) all phases of an attack validation scenario; and therefore validate that each of these security technologies will (likely) log, detect, prevent, and/or alert on analogous network behaviors occurring during attack or other security threats on the network.

2.3 Network Isolation

The computer system can also execute Blocks of the method S100 concurrently with other internal, inbound, and outbound traffic and behaviors occurring on the network in order to validate configurations of these security technologies without necessitating isolation of the network or interruption of network service. The computer system can therefore execute Blocks of the method S100 to validate configurations of security technologies deployed on the network continuously, on regular intervals (e.g., daily, weekly), and/or in response to network configuration changes with minimal or no interruption to network access or bandwidth.

2.4 Terms

A "machine" is referred to herein as a computing device—such as a server, a router, a printer, a desktop computer, or a smartphone—within or connected to the computer network. An "asset" is referred to herein as a machine loaded with attack simulation software and configured to execute actions prescribed by a phase of an attack validation scenario.

An "attack validation scenario" is referred to herein as a corpus of actions executed by a group of assets within the network to simulate an attack, data loss event, or risky activity, etc. on the network. A "phase" is referred to herein as a group of actions executable by a single asset on the network during one contiguous phase window (e.g., less five seconds in duration) to simulate a sequence of behaviors by an asset during an attack, data loss event, or risky activity, etc. on the network. An "action" is referred to herein as one network activity initiated by an asset according to a phase during an assigned phase window in order to simulate a behavior by an asset during an attack, data loss event, or risky activity, etc. on the network. A "behavior" or "network behavior" is referred to herein as network activity initiated by an asset or machine connected to the network and not necessarily affiliated with a particular phase of an attack validation scenario.

An "event" or "network event" is referred to herein as a representation of a behavior on the network, such as: a window opening on an asset connected to the network; the window closing on the device; a file queried by an asset connected to the network; a file received by the asset; and the asset opened by the asset; etc. A security technology can store events in a log, such as in the form of metadata representative of behaviors on the computer network.

A "log" event is referred to herein as a representation of a behavior on the network observed by a security technology and written to a log by the security technology. For example, a log event can represent a lowest-level response and recordation by the security technology to a behavior on the network. Thus, "logging" referred to herein as a security technology writing a log event—representing a behavior on the computer network—to its log.

A "detection" event is referred to herein as a representation of one or a set of log events observed by a security technology, flagged as significant by the security technology, and written to the log by the security technology. For example, a security technology may recognize a single event or a chain of events stored in the log as possibly malicious and flag this event or chain of events for further investigation, such as by security personnel. In this example, the security technology may: log a file deletion event followed by a registry modification event at one machine on the network represented across two events in the security technology log; detect these events as a possible malicious chain of events on the computer network; and generate a detection event for these events accordingly. Thus, "detecting" is referred to herein as a security technology flagging one or a set of log events on the computer network as significant and writing a corresponding detection event to the log.

An "alert" or "alert event" is referred to herein as a prompt—generated by a security technology—written to the security technology's log and/or published to an alert feed by the security technology responsive to a significant event or chain of events detected by the security technology. For example, the security technology can generate an alert to investigate a particular detection event for malicious or risky activity; security personnel may then manually inspect this detection event and manually discard the detection event or elect to quarantine the corresponding machine on the network. Therefore, "alerting" referred to herein as a security technology writing an alert for a flagged or significant event to an alert feed or otherwise notifying security personnel of this event.

A "prevention" event is referred to herein as a representation of an action executed by the security technology to halt a behavior on the computer network, such as automatically and responsive to detection malicious or high-risk behavior on the network and without waiting for security personnel to respond to an alert related to this behavior or to a particular machine on the network. For example, the security technology can: halt a file transfer from one machine within the network to another machine internal or external to the computer network (or vice versa); quarantine a machine on the computer network; block further communications between two machines within the computer network; block further communications between two machine within and outside of the network; and write prevention events related to these actions to its log. Thus, "preventing" is referred to herein as a security technology executing an action to automatically reduce or isolate a threat, risky behavior, or a risky machine on the network and writing a corresponding prevention event to the log.

3. Attack Validation Scenario

Generally, an attack validation scenario includes a sequence of phases executable by one or more assets on the computer network to generate network actions: that mimic malicious phases of an attack on the network; or that otherwise are predicted to trigger logging, detection, prevention, and/or alerting by particular security technologies active on the network if these security technologies are properly configured for the network. For example, an attack validation scenario can include a sequence of phases, that, when executed by one or more assets on the network, trigger a sequence of network actions of particular types that are analogous to malicious phases within a known security threat or within a network attack archetype.

In one implementation, an attack validation scenario is created manually by a human operator, such as to validate a particular security technology (e.g., an endpoint security, threat intelligence, cyber attack response, or security aggregation technology) deployed to a network or a particular combination of security technologies deployed on the network. Alternatively, when a new threat (e.g., malware, riskware, phishing, malvertising, botnet) is identified, characterized, and published to a threat intelligence database, a remote computer system can partially or fully automate generation of a new attack validation scenario containing a sequence of phases that are analogous to or otherwise mimic known phases of this new threat.

3.1 Integration Manager

In one implementation, when the method S100 is enabled on the computer network, an administrator or other affiliate of the computer network: installs an instance of the integration manager on a machine within the computer network; and supplies login information or other credentials for security technologies (e.g., direct and aggregate network threat management systems) installed or enabled across the computer network or at particular assets within the network. The integration manager can then load plugins for these security technologies and automatically enter login information or other credentials supplied by the administrator in order to gain access to event lots and alert feeds of these security technologies. The integration manager can also retrieve current settings and configurations of these security technologies within the network, such as: whether these security technologies are active; and whether active security technologies are configured to log, detect, prevent, or alert on certain types or behavior on the network.

3.2 Phase Configuration

In one implementation, the integration manager retrieves a template attack validation scenario containing a set of phases that collectively prescribe (or "trigger") actions analogous to a known network attack archetype. The integration manager then—automatically or with guidance of a human operator—selectively mutes or disables phases in the attack validation scenario that trigger actions that a current combination of security technologies deployed on the network are not currently configured to log, detect, prevent, or alert on. The integration manager can also—automatically or with guidance of a human operator: set attributions between the remaining phases in the attack validation scenario and active security technologies within the network; and assign response types (e.g., logging, detection, prevention, and/or alerting) by attributed security technologies to each phase based on current configurations of these security technologies.

More specifically, the integration manager (or other remote computer system—such as autonomously or with guidance from a human operator)—can assign target parameters to phases within the attack validation scenario based on characteristics of these phases and configurations of security technologies deployed on the network. For example, for each phase of the attack validation scenario, the integration manager (or other remote computer system, or human operator) can specify a particular "target" security technology—within the set of security technologies deployed on the network—to log network actions prescribed by the phase. Alternatively, the integration manager (or other remote computer system, or human operator) can specify a particular "target category" of security technologies to log network actions prescribed by the phase, such as all endpoint detection response technologies. The integration manager (or other remote computer system, or human operator) can also assign a target asset on the network to execute this phase of the attack validation scenario, such as one of a subset of assets on the network on which the target security technology is currently active.

3.3 Response Type

Furthermore, the integration manager (or other remote computer system, or human operator) can: retrieve a service level agreement of the target security technology; extract a response type (e.g., log, detect, prevent, and/or alert) for actions prescribed by the phase from the service level agreement; and set this response type as a target response type for the phase. Additionally or alternatively, the integration manager (or other remote computer system, or human operator) can: retrieve a current response type that the target security technology is currently configured to execute for behavior types of actions specified in the phase; and set this response type as a target response type for this phase of the attack validation scenario.

The computer system can implement similar methods and techniques to assign particular target response types to individual actions or subsets of action prescribed by a phase within the attack validation scenario.

3.4 Polling Window

Similarly, the integration manager (or other remote computer system, or human operator) can set a polling window over which the integration manager pools events and alerts logged and published by a security technology following execution of a corresponding phase of the attack validation scenario by an asset on the computer network. In the particular, throughout the polling window including or immediately succeeding a phase window in which an asset executed actions prescribed by a phase of the attack validation scenario, the integration manager can: aggregate network events and alerts generated by a security technology assigned to respond to this phase; and implement methods and techniques described below to correlate these network events and alerts—read from the log and/or alert feed before the polling window expired—to the phase or to particular actions within the phase. The polling window can therefore define a time limit for execution of the target response type by the target security technology once the phase of the attack validation scenario is deployed to a target asset on the network.

In one implementation, the integration manager assigns a duration of a polling window to a phase based on a network event log latency limit specified in a service level agreement of the security technology, as shown in FIG. 2A. For example, the integration manager can: retrieve a service-level agreement for the target security technology; extract a contracted time duration for logging, detecting, preventing, or alerting on behavior types of actions prescribed by the phase; and store this time duration (with a buffer, such as a 10% buffer) as a polling window for this phase of the attack validation scenario. In another example, the integration manager can: retrieve logging, detection, prevention, and/or alert times for similar attack validation scenarios and phases previously completed on the network and/or on other networks by the same or similar security technology; average or otherwise combine these logging, detection, prevention, and/or alert times to calculate a duration for responding to this phase of the attack validation scenario by the target security technology; and then store this duration as a polling window for the phase of the attack validation scenario.

Additionally or alternatively, the integration manager can prompt the human operator to set this polling window manually. For example, the integration manager can present a time limit—indicated in the service level agreement of the target security technology—for responding to actions prescribed by the phase to a human operator (affiliated within the network) via an operator portal. The integration manager can also: retrieve or calculate a range of or average logging, detection, prevention, and/or alert times for similar phases and security technologies on this and/or other networks; and present these times as alternative options to the human operator via the operator portal. The integration manager can then: prompt the human operator to set a maximum time limit for response to the phase in light of these supporting data; and record this time limit as a polling window for this phase of the attack validation scenario.

3.5 Artifacts

The integration manager (or other remote computer system, or human operator) can also specify artifacts of actions executed by a target asset according to the phase and which the computer system (e.g., correlation workers within or outside of the network) can later interpret to associate network behaviors with the phase or with particular actions therein.

In one implementation, the integration manager can populate a descriptor file with artifact warrants that trigger generation of artifacts on the network when prescribed by the phase once deployed to the target asset; and write the descriptor file to this phase of the attack validation scenario. In one example, the descriptor file can include: a first artifact warrant that triggers generation of a registry key containing a particular known integer or floating-point value during a first action in the phase; a second artifact warrant that triggers a ping or query to a particular known IP or MAC address during a second action in the phase; and/or a third artifact warrant that triggers transmission of a query containing a particular file hash, IPv4 address, or tactic ID during a third action in the phase. Therefore, when a target asset on the network executes this phase of the attack validation scenario, the target asset can: generate a registry key containing the particular integer or floating-point value according to the first artifact warrant when executing the first action; ping or query the particular IP address according to the second artifact warrant when executing a second action; and/or transmit a query containing the particular file hash, IPv4 address, or tactic ID when executing the third action.

However, the integration manager, a human operator internal or external to the computer network, a remote computer system, or another entity can define and configure a phase of the attack validation scenario in any other way.

The integration manager, a human operator internal or external to the computer network, a remote computer system, or another entity can also: repeat this process for each other phase in the attack validation scenario; order these phases in the attack validation scenario; and then deploy the attack validation scenario to the computer network, including deploying each phase in the attack validation scenario to its target asset within the computer network.

4. Attack Validation Scenario Scheduling and Deployment

Block S110 of the method S100 recites deploying a phase—within an attack validation scenario analogous to a network security threat—to a target asset on a computer network. Generally, in Block S110, the integration manager (or other internal or external entity) can: queue the attack validation scenario for execution on the computer network; and schedule distinct phases within the attack validation scenario for execution on their corresponding target assets on the computer network.

In one implementation, the integration manager defines a schedule for deploying an attack validation scenario—analogous to a particular security threat archetype—to the computer network, such as daily or weekly. In this implementation, the integration manager can validate security technologies on a regular interval in order to account for implicit network configuration creep and explicit network changes over time, to detect misconfiguration of security technologies deployed on the network, and to prompt reconfiguration of these security technologies accordingly. Therefore, in this implementation, the integration manager can deploy the attack validation scenario on the network according to this recurrent schedule.

Additionally or alternatively, the integration manager can selectively deploy attack validation scenarios to the computer network: responsive to automatically-detected or manually-confirmed changes to configurations or settings within the network; when an asset is added to or removed from the network; when a new security technology is deployed to the network; and/or when a security technology previously active on the network is deactivated.

However, in this implementation, the integration manager can selectively deploy the attack validation scenario to the network responsive to any other trigger.

The integration manager can also selectively deploy a particular phase of the attack validation scenario to different assets throughout the network over time—such as within a single attack validation scenario or across multiple recurrent or contingent instances of the attack validation scenario executed on the network over time—in order to verify that a target security technology assigned to this particular phase of the attack validation scenario is properly configured on each of these assets.

Once the attack validation scenario is deployed to or queued on the network, the integration manager can selectively trigger each phase of the attack validation scenario at its corresponding target asset in Block S110. Furthermore, once a phase of the attack validation scenario is thus deployed to its target asset within the network, the target asset can execute actions, instigate network behaviors, and generate artifacts according to the parameters and characteristics of the phase.

5. Security Technology Data Access and Aggregation

Block S120 of the method S100 recites, during the polling window following the phase window, polling a log of a security technology deployed on the network for a sequence of events associated with the target asset. Generally, in Block S120, once a phase is activated at an asset on the network at a start time, the integration manager can retrieve and pool events written to a log associated with the target security technology and/or alerts published to a separate alert feed by the target security technology during a polling window following this start time.

In one implementation shown in FIG. 2A, when a phase within the attack validation scenario is deployed to its target asset within the network at a scheduled start time, the integration manager sets a timer for the polling window assigned to this phase of the attack validation scenario. While this timer is active, the computer system pools events written to the log (and alerts published to the alert feed) by the target security technology assigned to this phase of the attack validation scenario. For example, the integration manager can: query this security technology log and alert feed continuously, once per minute, or once per hour, etc. for network events until the timer for this phase expires; and write events returned by the log and alert feed to a phase validation docket.

5.1 Pre-Filter

In one implementation shown in FIG. 2A, the integration manager can also filter events pooled from the log the alert feed based on known parameters and characteristics of the phase. For example, the integration manager can filter these events: by the IP address or other identifier of the target asset assigned to the phase of the attack validation scenario; by known actions types prescribed by the phase; and by artifact characteristics (e.g., register key, IP address) defined by artifact warrants assigned to the phase.

The integration manager can then aggregate this filtered set of events and alerts into a phase validation docket for this phase of the attack validation scenario and store this phase validation docket in a local or remote database.

6. Phase Correlation

Block S130 of the method S100 recites calculating correlation scores for events—in the sequence of events—to the phase based on proximities of timestamps of events—in the sequence of events—to the phase window. Generally, in Block S130, the integration manager can mobilize correlation workers (e.g., virtual machines) within or outside of the network to derive strengths of correlations between events and alerts contained in a phase validation docket and known parameters and characteristics of the phase deployed on the network. The integration manager can then merge (or "fuse") correlations across multiple time, asset, behavior type, and/or artifact domains to verify whether each of these events and alerts corresponds to the attack validation scenario, as shown in FIG. 2A.

6.1 Behavior/Action Type

In one implementation shown in FIG. 2A, a first correlation worker implements a behavior-based correlation model to derive strengths of correlation between: types of behaviors represented in a first event contained in the phase validation docket; and a first action prescribed by the phase. For example, the first correlation worker can calculate a higher first correlation score for the first event and the first action: if the type of a behavior represented or indicated in the first event matches a type of the first action (e.g., send query, load file, or open file); and vice versa.

The first correlation worker stores this first correlation score for the strength of this correlation between the first event and the first action in the phase.

6.2 Time

In another implementation shown in FIG. 2A, a second correlation worker implements a time-based correlation model to derive a strength of correlation between: an order of the first event within the set of events and alerts contained in phase validation docket; and a known order of the first action within the sequence of actions prescribed by the phase. Additionally or alternatively, the second correlation worker can implement a time-based correlation model to derive a strength of correlation between: a time offset between the first event and a preceding or succeeding event in the phase validation docket; and time offsets between the first action and a preceding or succeeding action prescribed by the phase. For example, the second correlation worker can: calculate a high second correlation score for the first event and the first action if the first action is triggered first by the phase and if the timestamp of the first event precedes timestamps of all or most other events in the phase validation docket; calculate a high second correlation score for the first event and the first action if the first action is triggered last by the phase and if the timestamp of the first event succeeds timestamps of all or most other events in the phase validation docket; and calculate a lower second correlation score for the first event and the first action if the first action is triggered first by the phase and if the timestamp of the first event succeeds timestamps of all or most other events in the phase validation docket.

The second correlation worker stores this second correlation score for the strength of this correlation between the first event and the first action in the phase.

In a similar implementation, the second correlation worker implements a time-based correlation model to derive a strength of correlation between: a timestamp of the first event within the set of events and alerts contained in the phase validation docket; and a known phase window in which the target asset executes the phase. For example, the second correlation worker can: calculate a high second correlation score for the first event and the phase if the timestamp of the first event falls within the phase window in which the target asset executes the phase; and vice versa. Similarly, the second correlation worker can then calculate a second correlation score between the first event and the phase inversely proportional to a time offset between the timestamp of the event and the phase window.

6.3 Indicators of Compromise

In another implementation shown in FIG. 2A, a third correlation worker implements an IOC-based correlation model to derive a strength of correlation between: indicators of compromise represented in the first event; and known indicators of compromise contained within the first action in the phase. For example, the first correlation worker can calculate a high third correlation score for the first event and the first action: if the first event indicates unusual outbound network traffic and if the first action defines an anomalous network behavior; if the first event indicates an anomaly in privileged user account activity and if the first action triggers privileged account activity; if the first event indicates an anomalous log-in attempt and if the first action defines a log-in behavior; and vice versa.

The third correlation worker stores this third correlation score for the strength of this correlation between the first event and the first action in the phase.

6.4 Artifacts

In another implementation shown in FIG. 2A, a fourth correlation worker implements an artifact-based correlation model to derive a strength of correlation between: artifacts (e.g., register keys, IP addresses called or queried) contained in the first event; and known artifact values defined in artifact warrants contained in the first action. For example, the first correlation worker can calculate a high fourth correlation score for the first event and the first action: if the first event defines a communication between the target asset and a second machine at a particular IP address and if the first action specifies a query to the same IP address or to a network containing this IP address; if a registry key in the first event contains a value that matches a registry key warrant contained in the first action; and vice versa.

The fourth correlation worker stores this fourth correlation score for the strength of this correlation between the first event and the first action in the phase.

6.5 Fusion

The integration manager (or a fifth correlation worker) can then combine (or fuse") correlation scores thus calculated within the foregoing domains for the first event and the first action into one composite score, as shown in FIG. 2A.

6.6 First Event+Other Behaviors

The integration manager and/or correlation workers can repeat the foregoing processes to calculate composite scores for the first event and each other action prescribed by the phase, as shown in FIG. 2A.

6.7 Other Events+Behaviors

The integration manager and/or correlation workers can also repeat the foregoing processes to calculate composite scores for each other event and each action prescribed by the phase. The integration manager and/or correlation workers can also repeat the foregoing processes to calculate composite scores for each alert and each action prescribed by the phase.

6.8 Event/Alert Association

The integration manager can then: identify a subset of events and alerts associated with correlation scores—for actions in the phase—that exceed a threshold score; and associate these events and alerts with particular actions within the phase or with the phase more generally, as shown in FIG. 2A. (A particular event or alert may therefore be associated with multiple actions within the phase, such as if multiple correlation scores for a particular event and multiple actions exceeds the threshold score.)

In one implementation, the integration manager queues the correlation workers to recalculate correlation scores and the composite score following receipt of each additional batch of data from the log and alert feeds associated with the target security technology, such as once per minute or once per hour during the polling window of the phase. Alternatively, the integration manager can queue the correlation workers to execute this process following conclusion of the polling window.

7. Phase Confirmation

Block S140 of the method S100 recites, in response to a first correlation score of a first event, in the sequence of events, exceeding a threshold score, confirming logging of the phase by the security technology. Block S142 of the method S100 recites, in response to confirming logging of the phase by the security technology and in response to a difference between a first event type of the first event and the target response type of the phase, generating a prompt to reconfigure the security technology to respond to behaviors analogous to the phase, on the computer network, according to the target response type. Similarly, Block S144 of the method S100 recites, in response to the first correlation score of the first event below the threshold score, generating a prompt to reconfigure the security technology to log the first event.

Generally, in Blocks S140, S142, and S144, the integration manager can: verify whether the target security technology logged actions triggered by this phase of the attack validation scenario; confirm whether the target security technology properly detected actions triggered by this phase as significant; confirm whether the target security technology properly alerted on significant actions triggered by this phase; confirm whether the target security technology properly prevented actions triggered by this phase; and/or flag this target security technology for inspection and reconfiguration responsive to failure to log, detect, prevent, or alert on particular actions within the phase, shown in FIG. 3A.

7.1 Target Response Type: Logging

In one implementation shown in FIG. 3A, the integration manager selects a first action prescribed by the phase. If this first action is assigned a log, detection, prevention, or alerting response type, the integration manager scans the phase validation docket for a first subset of log, detection, and prevention events and alerts associated with correlation scores—for the first action—exceeding the threshold score. Then, if this first action is assigned a log response type and if the first subset of events and alerts is empty, the integration manager can: identify a logging failure for the target security technology; and generate a prompt to reconfigure the target security technology to enable logging of the first action and analogous behaviors on the network. Alternatively, if this first action is assigned a log response type and if the first subset of events and alerts contains a detection event, a prevention event, or an alert, the integration manager can: identify an over-response failure for the target security technology; and generate a prompt to reconfigure the target security technology to desensitize the target security technology to the first action and analogous behaviors on the network. Yet alternatively, if this first action is assigned a log response type and if the first subset of events and alerts contains a logging event only, the integration manager can verify the current configuration of the target security technology.

7.2 Target Response Type: Detect Sans Alert

In the foregoing implementation and as shown in FIG. 3A, if the first action is assigned an alert-free detection response type and if the first subset of events and alerts is empty, the integration manager can: identify a logging and detection failure for the target security technology; and generate a prompt to reconfigure the target security technology to enable logging and detection of the first action and analogous behaviors on the network. Alternatively, if the first action is assigned an alert-free detection response type and if the first subset of events and alerts contains a log event only, the integration manager can: identify a detection failure for the target security technology; and generate a prompt to reconfigure the target security technology to detect the first action and analogous behaviors on the network as significant. Yet alternatively, if the first action is assigned an alert-free detection response type and if the first subset of events and alerts contains a prevention event and/or an alert, the integration manager can: identify an over-response failure for the target security technology; and generate a prompt to reconfigure the target security technology to desensitize the target security technology to the first action and analogous behaviors on the network and/or disable alerts for the first action and analogous behaviors on the network. Yet alternatively, if this first action is assigned an alert-free detection response type and if the first subset of events and alerts contains a detection event only, the integration manager can verify the current configuration of the target security technology.

7.3 Target Response Type: Detection+Alert

Similarly, in the foregoing implementation and as shown in FIG. 3A, if the first action is assigned a detection and alert response type and if the first subset of events and alerts is empty, the integration manager can: identify a logging, detection, and alerting failure for the target security technology; and generate a prompt to reconfigure the target security technology to enable logging, detection, and alerting on the first action and analogous behaviors on the network. Alternatively, if the first action is assigned a detection and alert response type and if the first subset of events and alerts contains a log event only, the integration manager can: identify a detection and alerting failure for the target security technology; and generate a prompt to reconfigure the target security technology to detect and alert on the first action and analogous behaviors on the network. Yet alternatively, if the first action is assigned a detection and alert response type and if the first subset of events and alerts contains a detection event only, the integration manager can: identify an alerting failure for the target security technology; and generate a prompt to reconfigure the target security technology to generate alerts for the first action and analogous behaviors on the network.

Furthermore, if the first action is assigned a detection and alert response type and if the first subset of events and alerts contains a prevention event, the integration manager can: identify an over-response failure for the target security technology; flag the security technology for failing to properly alert on the first action; and generate prompt to adjust sensitivity of the security technology to publish alerts—in place of prevention actions—responsive to behaviors analogous to the first action on the computer network.

However, if this first action is assigned a detection and alert response type and if the first subset of events and alerts contains a detection event and an alert, the integration manager can verify the current configuration of the target security technology.

7.4 Target Response Type: Prevention

In the foregoing implementation and as shown in FIG. 3A, if the first action is assigned a prevention response type and if the first subset of events and alerts is empty, the integration manager can: identify a logging, detection, and prevention failure for the target security technology; and generate a prompt to reconfigure the target security technology to enable logging and prevention on the first action and analogous behaviors on the network. Alternatively, if the first action is assigned a prevention response type and if the first subset of events and alerts contains a log event only, the integration manager can: identify a detection and prevention failure for the target security technology; and generate a prompt to reconfigure the target security technology to detect and prevent the first action and analogous behaviors on the network. Yet alternatively, if the first action is assigned a prevention response type and if the first subset of events and alerts contains a detection event and/or an alert, the integration manager can: identify a prevention failure for the target security technology; and generate a prompt to increase sensitivity of the target security technology to autonomously execute prevention actions responsive to behaviors analogous to the first action on the computer network.

However, if this first action is assigned a prevention response type and if the first subset of events and alerts contains a prevention event, the integration manager can verify the current configuration of the target security technology.

7.5 Extended Polling Window

Furthermore, in the foregoing implementation and as shown in FIG. 2B, if the integration manager fails to identify an event or alert—pooled from the log or alert feed—that matches the target response type of the first action and exhibits a correlation score with the first action in excess of the threshold score upon expiration of the polling window, the integration manager can: continue to pool events and alerts from the log and alert feed over an extended polling window (e.g., an additional hour; 50% of the duration of the polling window); and repeat the foregoing process to detect the response of the target security technology to the first action.

For example, during the phase window, the target asset can execute the first action—associated with a first target response type—according to the phase. The integration manager can then queue correlation workers to calculate correlation scores for events—in the sequence of events pooled from the log of the target security technology—representing the first action executed by the target asset during the phase window based on proximities of timestamps of events, in the sequence of events, to the phase window, presence of an indicator of compromise value in these events, etc. The integration manager can then: select a first event, in this sequence of events, in response to a first correlation score between the first event and the first action exceeding correlation scores of each other event in the sequence of events; and confirm logging of the first action in the phase by the security technology in response to the first correlation score of the first event exceeding a threshold score.

However, if all correlation scores between the first action and each event in this sequence of events collected during the polling window fall below the threshold score, the integration manager can repeat the foregoing methods and techniques to: poll the log for a second sequence of events—associated with the target asset—during an extended polling window succeeding the polling window; and calculate correlation scores for events in this second sequence of events. The integration manager can then: select a second event, in this second sequence of events, in response to a second correlation score between the second event and the first action exceeding correlation scores of each other event in the second sequence of events; and confirm logging of the first action in the phase by the security technology in response to the second correlation score of the second event exceeding the threshold score. Accordingly, in response to confirming logging of the first event by the security technology and in response to a type of the second event matching the target response type of the first action, the integration manager can: confirm configuration of the security technology to respond to the first action in the phase in Block S144; and generate a prompt to reconfigure the security technology to reduce latency for responding to behaviors analogous to the first action on the computer network.

7.6 Single Event:Multiple Actions

In one variation, a target response type is assigned to a set (or "cluster") of actions prescribed in the phase, and the integration manager verifies that the target security technology generated a detection event, a prevention event, and/or an alert responsive to the set of actions during execution of the phase.

In one implementation, the integration manager selects a first group of actions—including a first action, a second action, etc.—prescribed by the phase. If this first group of actions is assigned a detection, prevention, or alerting response type, the integration manager scans the phase validation docket for a first subset of log, detection, and prevention events and alerts associated with correlation scores—for at least one action in the first group of actions—exceeding the threshold score. Then, if the first group of actions is assigned a detection and alert response type and if the first subset of events and alerts is empty, the integration manager can: identify a detection and alerting failure for the target security technology; and generate a prompt to reconfigure the target security technology to increase sensitivity to detecting the first group of actions and analogous behaviors on the network as significant and generate alerts accordingly. Alternatively, if the first group of actions is assigned a detection and alert response type and if the first subset of events and alerts contains a detection event only, the integration manager can: identify an alerting failure for the target security technology; and generate a prompt to reconfigure the target security technology to generate alerts for the first group of actions and analogous behaviors on the network. Furthermore, if the first group of actions is assigned a detection and alert response type and if the first subset of events and alerts contains a prevention event, the integration manager can: identify an over-response failure for the target security technology; flag the security technology for failing to properly alert on the first group of actions; and generate a prompt to adjust sensitivity of the security technology to publish alerts—in place of prevention actions—responsive to behaviors analogous to the first group of actions on the computer network. However, if this first group of actions is assigned a detection and alert response type and if the first subset of events and alerts contains a detection event and an alert, the integration manager can verify the current configuration of the target security technology.

Similarly, if the first group of actions is assigned a prevention response type and if the first subset of events and alerts is empty, the integration manager can: identify a detection and prevention failure for the target security technology; and generate a prompt to reconfigure the target security technology to increase sensitivity to detecting and autonomously preventing the first group of actions and analogous behaviors on the network as significant. Alternatively, if the first group of actions is assigned a prevention response type and if the first subset of events and alerts contains a detection event and/or an alert, the integration manager can: identify a prevention failure for the target security technology; and generate a prompt to increase sensitivity of the target security technology to autonomously execute prevention actions responsive to behaviors analogous to the first group of actions on the computer network. However, if this first group of actions is assigned a prevention response type and if the first subset of events and alerts contains a prevention event, the integration manager can verify the current configuration of the target security technology.

7.7 Other Events/Alerts

The integration manager can repeat the foregoing methods and techniques to verify responsiveness of the target security technology to each other action or group of actions prescribed in the phase.

8. Other Security Technologies

The integration manager and the correlations workers can repeat the foregoing methods and techniques to: pool events and alerts published by other security technologies deployed on the network during the polling window following the phase window in which the target asset executes actions prescribed by the phase; correlate these events and alerts to these actions or groups of actions within the phase; and record response types of these security technologies to these actions or groups of actions.

The integration manager can then: verify that at least security technology achieved that target response type for each action or group of actions; and characterize redundancy of these security technologies to achieve certain response types for these actions or groups of actions.

9. Other Phases

Figure 3B:
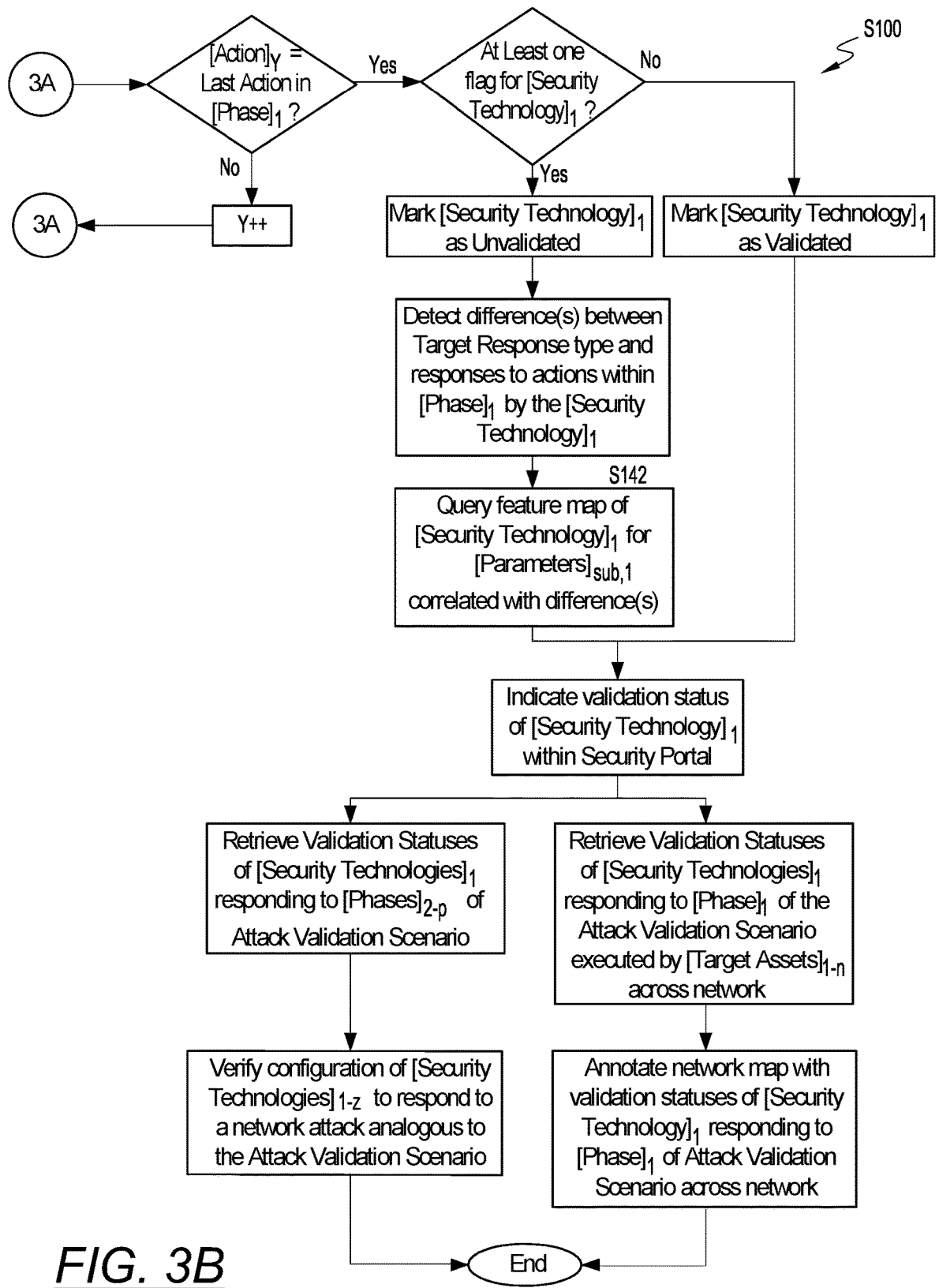

The computer system, the integration manager, and the correlations workers can repeat the foregoing methods and techniques: to deploy other phases within the attack validation scenario to the same or other target assets on the network, such as concurrently or sequentially; to verify whether target security technologies for each of these phases to achieve the target responses types for actions and groups of actions in these phases; and to generate prompts to selectively reconfigure these security technologies based on these verification results, as shown in FIG. 3B.

More specifically, the integration manager can concurrently or sequentially repeat the foregoing methods and techniques to validate logging, detection, prevention, and/or alerting by the same or other security technologies deployed on the network for actions within each other phase of the attack validation scenario.

10. Scenario Confirmation

During or upon conclusion of the attack validation scenario, the integration manager (or other computer system) can aggregate validation results for phases of the attack validation scenario and present these validation results to a human operator or other security personnel affiliated with the network.

For example, the integration manager can return these validation results to a security portal—accessible by security personnel—within a native application or web browser executing on a personal computing device. The security portal can then: render a list of phases in the attack validation scenario; label each of these phases with a description of functionality tested by the phase; indicate a target security technology for each of these phases; label each phase with its corresponding validation result, such as whether the target security technology achieved the target response type for each action and group of actions within the phase; and indicate log, detection, prevention, and/or alerting latencies for actions within these phases (e.g., based on time differences between phase windows and times that events or alerts were posted to security technology logs or an alert feed).

In this example, the security portal can highlight (e.g., with "X"s) phases containing unverified actions or groups of actions and/or annotate these unverified phases with prompts to inspect and reconfigure security technologies assigned to these phases of the attack validation scenario. Conversely, in this example, the security portal can indicate (e.g., with checkmarks) phases contain only verified actions and verified groups of actions or otherwise highlight these verified phases with confirmation that security technologies assigned to these phases performed as planned (or "expected").

10.1 Reconfiguration Recommendations

In one variation as shown in FIG. 3B, the security portal flags or highlights a security technology that failed at least one response type in its assigned phase and presents a recommendation for reconfiguring the security technology to preempt this failure when the phase is rerun on the target asset and when analogous behaviors occur on the computer network in the future.

In one implementation, in response to failure of a target security technology to conform to a target response type for an action within a phase, the security portal (or the computer system) can access a feature map of the security technology, such as in the form of a predefined model, decision tree, or artificial intelligence that defines associations between parameters and configurations of the security technology and: logging, detection, prevention, and alerting behaviors of the security technology; sensitivity of the security technology to detecting significant behaviors; alert routing by the security technology; and prevention sensitivities of the security technology; etc. The security portal can then: access a current feature setting of the security technology, such as by querying the security technology directly for its current settings on the computer network; and then correlate failure of the security technology—to properly respond to the action within the phase—with a particular feature of the security technology based on the feature map and the current feature setting of the security technology. For example, the security portal can insert the target response type, the actual response type, characteristics of the action, and the current feature setting of the security technology into the feature map, which can then return a (ranked or aggregate) set of possible adjustments to settings of the security technology that may correct this failure. The security portal can then generate a prompt to reconfigure the security technology according to the set of possible adjustments.

10.2 Attack Validation Scenario Network Map

In another implementation shown in FIG. 3B, the security portal (or the computer system) accesses a spatial representation of the computer network (e.g., a "network map"), such as including representations of types, locations, and addresses of machines connected to the network. The security portal then: annotates a first representation of a first target asset in this network map with a verification result of a first security technology assigned to respond to actions prescribed by a first phase of the attack validation scenario executed by the first target asset; annotates a second representation of a second target asset in this network map with a verification result of a second security technology assigned to respond to actions prescribed by a second phase of the attack validation scenario executed by the second target asset; and repeats this process for other target assets that executed phases in the attack validation scenario in order to generate a spatial representation of verification results of security technologies deployed across the network. The security portal can then present this annotated network map to the human operator in order to communicate locations throughout the network in which these security technologies are fulfilling and failing target response types to actions prescribed by phases within the attack validation scenario— and to thus communicate locations throughout the network in which these security technologies may fail to log, detect, prevent, or alert on analogous behaviors during an attack or data-loss event on the computer network.

In this implementation, the security portal can also annotate each representation of target assets in this network map with latencies of responses by a corresponding security technology to individual actions, groups of action, or the phase more generally executed by these target assets during the attack validation scenario, thereby communicating likely latency of responses to analogous behaviors on the network by the security technology to the human operator.

10.3 Phase Validation Map

In one variation shown in FIG. 3B, the integration manager implements methods and techniques described above: to deploy a particular phase to multiple (or many) other target assets on the network, such as concurrently or sequentially; to verify whether a target security technology achieved the target response types for actions and groups of actions within this phase for each instance of the phase executed by target assets across the network; and to generate prompts to selectively reconfigure this security technology at particular machines or in particular regions of the network based on these verification results.

In this variation, the security portal (or the computer system) can also: access the network map of the computer network described above; annotate a first representation of a first target asset in this network map with a first verification result of a security technology assigned to respond to actions prescribed by a phase of the attack validation scenario during a first instance of this phase executed by the first target asset; annotate a second representation of a second target asset in this network map with a verification result of the security technology during a second instance of this phase executed by the second target asset; and repeat this process for other target assets that executed an instance of this phase in order to generate a spatial representation of verification results of the security technology to like actions occurring across the network. The security portal can then present this annotated network map to the human operator in order to communicate locations throughout the network in which the security technology fulfills and fails target response types to actions prescribed by this phase—and to thus communicate locations throughout the network in which this security technology may fail to log, detect, prevent, or alert on analogous behaviors during similar attacks or data-loss events at different locations throughout the computer network.

Therefore, in this variation, the security portal (or the computer system, the integration manager) can: generate a network map annotated with responses to instances of the phase—executed by different assets throughout the network—based on types of events and alerts generated by the security technology during polling windows following execution of instances of this phase by these target assets; and visually communicate validation of the security technology across the network to a human operator via this annotated network map.

However, the integration manager and the security portal can present validation results for the attack validation scenario to security personnel in any other format in order to alert security personnel of particular security technologies that are not currently configured to respond to network behaviors according to their service level agreements or other expectations.

11. Reconfiguration Verification

In one variation, after the integration manager (or the computer system) automatically detects reconfiguration of a security technology or after the human operator confirms reconfiguration of the security technology in response to failure of the security technology to properly respond to actions prescribed by a phase within the attack validation scenario, the integration manager can rerun a second instance of this phase at the same target asset and repeat the foregoing methods and techniques to verify that reconfiguration of the security technology resolved logging, detection, prevention, or alerting failure detected in the previous instance of the phase executed by this target asset.

In this variation, if the results of the second instance of the phase are not improved (e.g., detecting and alerting) or not sufficiently improved (e.g., now detecting but not alerting) over the first instance of the phase (e.g., logging but not detecting and alerting), the security portal can repeat the foregoing methods and techniques to prompt the human operator to further reconfigure the security technology. In this variation, the security portal can also: access a current feature setting of the security technology, such as by querying the security technology directly for its current settings on the computer network; compare this current feature setting to a last stored feature setting of the security technology to identify a change in configuration of the security technology; and automatically update the feature map of the security technology to weaken or remove a correlation— between this change in configuration of the security technology and correction of the response to an action (e.g., of a particular type or characteristic) in the phase by the security technology—in the feature map of the security technology.

Conversely, if the results of the second instance of the phase are improved over the first instance of the phase, the security portal can confirm validation of the security technology as described above. In this variation, the security portal can also: access a current feature setting of the security technology; compare this current feature setting to the last stored feature setting of the security technology to identify a change in configuration of the security technology; and automatically update the feature map of the security technology to create or strengthen a correlation—between this change in configuration of the security technology and correction of the response to an action (e.g., of a particular type or characteristic) in the phase by the security technology—in the feature map of the security technology.

Furthermore, in this variation, once the integration manager (or the security portal, the computer system) develops correlations—between changes in configurations of the security technology and correction of responses to particular types or characteristic of actions with attack validation scenarios (deployed on the computer network or across many computer networks) by the security technology—that exceed a threshold strength, the integration manager can automatically reconfigure the security technology based on these correlations responsive to subsequent failed phases of attack validation scenarios deployed on the computer network.

12. Automatic Re-Verification

In a similar variation, the integration manager (or the computer system) can: characterize the network (e.g., types and locations of machines on the network, users logged-in to these machines, software executing on these machines, types of security technologies deployed on the network) around the time the attack validation scenario is deployed to a target asset on the network; monitor and re-characterize the network over time (e.g., daily, hourly); and redeploy the attack validation scenario when the network changes by more than a threshold (e.g., a 5% increase in the number of machines connected to the network; a 10% change in the proportion of a particular type of machine connected to the network; a new sentinel or security technology deployed on the network).

For example, the integration manager can: deploy a first instance of the attack validation scenario at a first time; validate security technologies deployed on the network at the first time based on results of the first instance of the attack validation scenario; and characterize a first network fingerprint of the computer network around the first time. The computer system can re-characterize network fingerprints of the computer network over time, such as hourly or daily. Then, in response to a difference between the first network fingerprint and a subsequent network fingerprint exceeding a threshold difference, the integration manager can redeploy a second instance of the attack validation scenario to the same target assets and repeat the foregoing methods and techniques to confirm that the current configuration of these security technologies are viable for fulfilling target responses to actions prescribed by phases within this attack validation scenario in light of changes to the computer network.

13. Gap Validation Scenario

In one variation, the integration manager implements similar methods and techniques to deploy an attack validation scenario in order to verify whether at least one security technology is currently configured fulfill each target logging, detection, prevention, and/or alerting responses assigned to actions prescribed by a phase of the attack validation scenario. More specifically, in this variation, the integration manager implements similar methods and techniques to deploy an attack validation scenario in order to verify that the current configuration of security technologies deployed on the network is sufficient to log, detect, prevent, and/or alert on each action or group of actions within a phase of the attack validation scenario, even if allocation of logging, detection, prevention, and alert responsibilities by these the security technologies are not known or assigned.

Generally, in this variation, rather than assign a particular security technology to log, detect, prevent, or alert on a particular action prescribed in a phase of the attack validation scenario, the integration manager can instead designate all security technologies deployed on the network as possible executors of logging, detection, prevention, and/or alerting regimes for particular actions within the phase. Then, once this phase in the attack validation scenario is queued and deployed to a target asset on the network, the integration manager can: pool events from logs for all security technologies deployed to the asset (or otherwise active on the network); pool alerts published by all of these security technologies; store these events and alerts in a phase validation docket; mobilize correlation workers to derive correlations between known parameters and characteristics of actions within the phase and events and alerts stored in phase validation docket for each of these security technologies; and then verify whether any of these security technologies logged, detected, prevented, or alerted on each action or group of actions within the phase based on these correlations.

The integration manager can thus generate: a first list of security technologies that logged an action within the phase; a second list of security technologies that detection the action within the phase; a third list of security technologies that prevented the action within the phase; and/or a fourth list of security technologies that alerted on the action within the phase. If the phase designated a logging-only response type for the action and the first list is null, then the integration manager can prompt security personnel—such as through the security portal—to reconfigure at least one security technology deployed to the network (or to the asset in particular) to improve logging of the action and analogous behaviors on the network. Similarly, if the phase designated a detection response type for the action and the second list is null, the integration manager can prompt security personnel to reconfigure at least one security technology deployed to the network to improve detection of the action and analogous behaviors on the network. If the phase designated a prevention response type for the action and the third list is null, the integration manager can prompt security personnel to reconfigure at least one security technology deployed to the network to improve prevention of the action and analogous behaviors on the network. Furthermore, if the phase designated an alert response type for the action and the fourth list is null, the integration manager can prompt security personnel to reconfigure at least one security technology deployed to the network to improve alerting of the action and analogous behaviors on the network.

The integration manager can repeat this process for each other action prescribed by the phase and for each other phase within the attack validation scenario and then return validation results from each action and phase of the attack validation scenario to security personnel—such as through the security portal—in order to enable security personnel to identify analogous behaviors for which security technologies deployed on the network are not currently configured to log, detect, prevent, or alert (i.e., security "gaps").

Therefore, in this variation, the integration manager (or the security portal, the computer system) can: confirm logging of an action within the phase by a suite of security technologies deployed on the network in response to at least one log event—in the phase validation docket—correlated with this action exceeding a threshold score; confirm detection of the action by the suite of security technologies deployed on the network in response to at least one detection event—in the phase validation docket—correlated with this action exceeding the threshold score; and confirm prevention of the action by the suite of security technologies deployed on the network in response to at least one prevention event—in the phase validation docket—correlated with this action exceeding the threshold score. The security portal (or the integration manager, the computer system) can also: generate a prompt to reconfigure (or "adjust") the suite of security technologies to respond to behaviors analogous to the action within the phase according to a target response type assigned to the action in response to a difference between this target response type and events and alerts—correlated with the action—in the phase validation docket.

As a person skilled in the art will recognize from the previous detailed description and from the figures and claims, modifications and changes can be made to the embodiments of the invention without departing from the scope of this invention as defined in the following claims.

We claim:

1. A method for verifying configurations of security technologies deployed on a computer network comprising:
    deploying a phase, within an attack validation scenario analogous to a network security threat, to a target asset on the network, the phase defining an action comprising an indicator of compromise and associated with a polling window and a target response type and executed by the target asset during a phase window;
    during the polling window following the phase window, polling a log of a security technology deployed on the network for a sequence of events associated with the target asset;
    for each event in the sequence of events, calculating a correlation score for the event:
        inversely proportional to a time offset between a timestamp of the event and the phase window; and
        as a function of presence of a value corresponding to the indicator of compromise in the event;
    in response to a first correlation score of a first event, in the sequence of events, exceeding a threshold score, confirming logging of the phase by the security technology; and
    in response to confirming logging of the phase by the security technology and in response to a difference between a first event type of the first event and the target response type of the phase, generating a prompt to reconfigure the security technology to respond to behaviors analogous to the phase, on the computer network, according to the target response type.

2. The method of claim 1, further comprising:
    deploying a second phase, within the attack validation scenario, to a second asset on the computer network, the second phase associated with a second polling window and a second target response type and executed by the second asset during a second phase window;
    during the second polling window following the second phase window, polling the log of the security technology for a second sequence of events associated with the second asset;
    calculating correlation scores for events, in the second sequence of events, based on proximities of timestamps of events, in the second sequence of events, to the second phase window; and
    in response to correlation scores of the second sequence of events falling below the threshold score:
        flagging the security technology for failing to log the second phase; and
        generating a second prompt to reconfigure the security technology to log behaviors analogous to the second phase on the computer network.

3. The method of claim 1, further comprising assigning a duration of the polling window to the phase based on a network event log latency limit specified in a service level agreement of the security technology.

4. The method of claim 1, further comprising:
    deploying the phase to a second asset on the computer network, the phase associated with a second polling window and a second target response type and executed by the second asset during a second phase window;
    during the second polling window following the second phase window, polling the log of the security technology for a second sequence of events associated with the second asset;
    calculating correlation scores for events, in the second sequence of events, based on proximities of timestamps of events, in the second sequence of events, to the second phase window;
    in response to correlation scores of the second sequence of events falling below the threshold score, polling the log for a third sequence of events, associated with the second asset, during an extended polling window succeeding the second polling window;
    calculating correlation scores for events, in the third sequence of events, based on proximities of timestamps of events, in the third sequence of events, to the second phase window;
    in response to a second correlation score of a second event, in the third sequence of events, exceeding the threshold score, confirming logging of the second phase by the security technology; and
    in response to confirming logging of the phase by the security technology and in response to a second event type of the second event matching the second target response type of the second phase:
        confirming configuration of the security technology to respond to the second phase; and
        generating a second prompt to reconfigure the security technology to reduce latency for responding to behaviors analogous to the second phase on the computer network.

5. The method of claim 1:
    further comprising, at the target asset, executing an action according to the phase during the phase window, the action associated with the target response type;
    wherein calculating a correlation score for each event in the sequence of events comprises calculating correlation scores for events, in the sequence of events, representing the action executed by the target asset during the phase window based on proximities of timestamps of events, in the sequence of events, to the phase window; and wherein confirming logging of the phase by the security technology comprises:
  selecting the first event in response to the first correlation score of the first event exceeding correlation scores of each other event in the sequence of events; and
  confirming logging of the phase by the security technology in response to the first correlation score of the first event exceeding the threshold score.

6. The method of claim 5:
wherein polling the log of the security technology for the sequence of events during the polling window comprises pooling the sequence of events written to the log of the security technology and published to an alert feed by the security technology during the polling window; and
wherein generating the prompt comprises, in response to the first event comprising a detection event and based on the target response type comprising alerting:
  flagging the security technology for failing to alert on the action; and
  generating the prompt to reconfigure alerting parameters of the security technology to publish alerts for behaviors analogous to the action on the computer network.

7. The method of claim 5, wherein generating the prompt comprises, in response to the first event comprising a detection event and based on the target response type comprising prevention:
  flagging the security technology for failing to prevent the action; and
  generating the prompt to adjust sensitivity of the security technology to autonomously execute prevention actions responsive to behaviors analogous to the action on the computer network.

8. The method of claim 5:
wherein polling the log of the security technology for the sequence of events during the polling window comprises pooling the sequence of events written to the log of the security technology and published to an alert feed by the security technology during the polling window; and
wherein generating the prompt comprises, in response to the first event comprising a prevention event and based on the target response type comprising alerting:
  flagging the security technology for failing to alert on the action; and
  generating the prompt to adjust sensitivity of the security technology to publish alerts, in place of prevention actions, responsive to behaviors analogous to the action on the computer network.

9. The method of claim 1:
further comprising
  during the polling window, polling a second log of a second security technology deployed on the network for a second sequence of events associated with the target asset; and
  calculating correlation scores for events, in the second sequence of events, based on proximities of timestamps of events, in the second sequence of events, to the phase window;
wherein confirming logging of the phase by the security technology comprises:
  confirming logging of the phase by a suite of security technologies, comprising the security technology and the second security technology, deployed on the network in response to at least one event, in the sequence of events and the second sequence of events, exceeding the threshold score; and
wherein generating the prompt comprises generating the prompt to reconfigure the suite of security technologies to respond to behaviors analogous to the phase, on the computer network, according to the target response type in response to absence of at least one event, in the sequence of events and the second sequence of events, exceeding the threshold score and representing an event type matching the target response type.

10. The method of claim 1, further comprising:
in response to confirming logging of the phase by the security technology and in response to the first event type of the first event matching the target response type of the phase, confirming configuration of the security technology to respond to the phase;
deploying a second phase, within the attack validation scenario, to a second asset on the computer network, the second phase associated with a second polling window and a second target response type and executed by the second asset during a second phase window;
during the second polling window following the second phase window, polling a second log of a second security technology deployed on the computer network for a second sequence of events associated with the second asset;
calculating correlation scores for events, in the second sequence of events, based on proximities of timestamps of events, in the second sequence of events, to the second phase window;
in response to a second correlation score of a second event, in the second sequence of events, exceeding the threshold score, confirming logging of the second phase by the second security technology;
in response to confirming logging of the second phase by the second security technology and in response to a second event type of the second event matching the second target response type of the second phase, confirming configuration of the second security technology to respond to the second phase; and
in response to confirming configuration of the security technology to respond to the phase and in response to confirming configuration of the second security technology to respond to the second phase, confirming configuration of security technologies deployed on the computer network to respond malicious attacks, analogous to the attack validation scenario, on the computer network.

11. The method of claim 1:
wherein generating the prompt to reconfigure the security technology comprises generating the prompt to reconfigure the security technology to respond to behaviors analogous to the phase, at the target asset, according to the target response type; and
further comprising:
  deploying a second instance of the phase to a second asset on the computer network, the second instance of the phase associated with a second polling window and executed by the second asset during a second phase window;
  during the second polling window following the second phase window, polling the log of the security technology for a second sequence of events associated with the second asset;
  calculating correlation scores for events, in the second sequence of events, based on proximities of timestamps of events, in the second sequence of events, to the second phase window;

in response to a second correlation score of a second event, in the second sequence of events, exceeding the threshold score, confirming logging of the second instance of the phase by the security technology; and in response to confirming logging of the second instance of the phase by the security technology and in response to a second event type of the second event matching the target response type of the phase, confirming configuration of the security technology to respond to the second phase at the second asset.

12. The method of claim 11, further comprising deploying a third instance of the phase to a third asset on the computer network, the third instance of the phase associated with a third polling window and executed by the third asset during a third phase window;

during the third polling window following the third phase window, polling the log of the security technology for a third sequence of events associated with the third asset;

calculating correlation scores for events, in the third sequence of events, based on proximities of timestamps of events, in the third sequence of events, to the third phase window; and generating a map of responses to instances of the phase, executed by assets throughout the network, based on events types of the first event, the second event, and the third event.

13. The method of claim 1:

further comprising at a first time, characterizing a first network fingerprint of the computer network; and at a second time succeeding the first time, characterizing a second network fingerprint of the computer network; and wherein deploying the phase to the target asset comprises deploying the phase to the target asset for execution by the target asset in response to a difference between the first network fingerprint and the second network fingerprint exceeding a threshold difference.

14. The method of claim 1:

further comprising, in response to confirming logging of the phase by the security technology and in response to the difference between the first event type of the first event and the target response type of the phase:

accessing a feature map of the security technology;

accessing a current feature setting of the security technology; and correlating the difference between the first event type of the first event and the target response type of the phase to a particular feature in the feature map based on the current feature setting of the security technology; and wherein generating the prompt to reconfigure the security technology comprises generating the prompt to reconfigure the particular feature of the security technology.

15. The method of claim 14, further comprising:

in response to reconfiguration of the particular feature of the security technology according to the prompt, deploying a second instance of the phase to the target asset, the second instance of the phase associated with a second polling window and executed by the target asset during a second phase window;

during the second polling window following the second phase window, polling the log of the security technology for a second sequence of events associated with the second asset;

calculating correlation scores for events, in the second sequence of events, based on proximities of timestamps of events, in the second sequence of events, to the second phase window;

in response to a second correlation score of a second event, in the second sequence of events, exceeding the threshold score, confirming logging of the second instance of the phase by the security technology; and in response to confirming logging of the second instance of the phase by the security technology and in response to a second event type of the second event matching the target response type of the phase:

confirming configuration of the security technology to respond to the second phase at the second asset; and confirming correlation between the particular feature and the difference between the first event type of the first event and the target response type of the phase.

16. A method for verifying configurations of security technologies deployed on a computer network comprising:

deploying a phase, within an attack validation scenario analogous to a network security threat, to a target asset on the network, the phase and associated with a polling window and a target response type and executed by the target asset during a phase window;

during the polling window following the phase window, polling a log of a security technology deployed on the network for a sequence of events associated with the target asset and a second log of a second security technology deployed on the network for a second sequence of events associated with the target asset;

calculating correlation scores for events, in the sequence of events and the second sequence of events, based on proximities of timestamps of events, in the sequence of events and the second sequence of events, respectively, to the phase window;

in response to a first correlation score of a first event, in the sequence of events, exceeding a threshold score:

confirming logging of the phase by a suite of security technologies, comprising the security technology and the second security technology, deployed on the network in response to at least one event, in the sequence of events and the second sequence of events, exceeding the threshold score; and in response to confirming logging of the phase by the security technology, in response to a difference between a first event type of the first event and the target response type of the phase, and in response to absence of at least one event, in the sequence of events and the second sequence of events, exceeding the threshold score and representing an event type matching the target response type:

generating a prompt to reconfigure the security technology to respond to behaviors analogous to the phase, on the computer network, according to the target response type.

17. The method of claim 16:

wherein deploying the phase to the target asset comprises deploying the phase, defining an action comprising an indicator of compromise, to the target asset; and wherein calculating the correlation scores for events, in the sequence of events, comprises:

for each event in the sequence of events, calculating a correlation score for the event:

inversely proportional to a time offset between a timestamp of the event and the phase window; and
as a function of presence of a value corresponding to an indicator of compromise in the event.

18. The method of claim 17:
wherein polling the log of the security technology for the sequence of events during the polling window comprises pooling the sequence of events written to the log of the security technology and published to an alert feed by the security technology during the polling window; and
wherein polling the second log of the second security technology for the second sequence of events during the polling window comprises pooling the second sequence of events written to the second log of the second security technology and published to the alert feed by the security technology during the polling window; and
wherein generating the prompt comprises, based on the target response type comprising alerting and in response to absence of at least one event, in the sequence of events and the second sequence of events, exceeding the threshold score and representing an alert:
flagging the suite of security technologies for failing to alert on the action; and
generating the prompt to adjust security technologies, in the suite of security technologies, to publish alerts responsive to behaviors analogous to the action on the computer network.

19. The method of claim 17:
further comprising, at the target asset comprising an endpoint on the computer network, executing an endpoint action according to the phase during the phase window, the endpoint action associated with the target response type;
wherein polling the log of the security technology comprises polling the log of the security technology in response to the security technology comprising an endpoint security technology, in a suite of endpoint security technologies, deployed on the computer network; and
wherein polling the second log of the second security technology comprises polling the second log of the second security technology in response to the second security technology comprising a second endpoint security technology, in the suite of endpoint security technologies, deployed on the computer network.

20. A method for verifying configurations of security technologies deployed on a computer network comprising:
deploying a phase, within an attack validation scenario analogous to a network security threat, to a target asset on the network, the phase and associated with a polling window and a target response type and executed by the target asset during a phase window;
at the target asset, executing an action according to the phase during the phase window, the action associated with the target response type;
during the polling window following the phase window:
polling a log of a security technology deployed on the network for a sequence of events associated with the target asset; and
pooling the sequence of events written to the log of the security technology and published to an alert feed by the security technology;
calculating correlation scores for events, in the sequence of events, comprising calculating correlation scores for events, in the sequence of events, representing the action executed by the target asset during the phase window based on proximities of timestamps of events, in the sequence of events, to the phase window;
in response to a first correlation score of a first event, in the sequence of events, exceeding a threshold score:
selecting the first event in response to the first correlation score of the first event exceeding correlation scores of each other event in the sequence of events; and
confirming logging of the phase by the security technology in response to the first correlation score of the first event exceeding the threshold score; and
in response to confirming logging of the phase by the security technology and in response to the first event comprising a detection event:
flagging the security technology for failing to alert on the action; and
generating the prompt to reconfigure alerting parameters of the security technology to publish alerts for behaviors analogous to the action on the computer network.

21. A method for verifying configurations of security technologies deployed on a computer network comprising:
deploying a phase, within an attack validation scenario analogous to a network security threat, to a target asset on the network, the phase and associated with a polling window and a target response type and executed by the target asset during a phase window;
at the target asset, executing an action according to the phase during the phase window, the action associated with the target response type;
during the polling window following the phase window, polling a log of a security technology deployed on the network for a sequence of events associated with the target asset;
calculating correlation scores for events, in the sequence of events, comprising calculating correlation scores for events, in the sequence of events, representing the action executed by the target asset during the phase window based on proximities of timestamps of events, in the sequence of events, to the phase window;
in response to a first correlation score of a first event, in the sequence of events, exceeding a threshold score, confirming logging of the phase by the security technology comprising:
selecting the first event in response to the first correlation score of the first event exceeding correlation scores of each other event in the sequence of events; and
confirming logging of the phase by the security technology in response to the first correlation score of the first event exceeding the threshold score; and
in response to confirming logging of the phase by the security technology and in response to a difference between a first event type of the first event and the target response type of the phase:
flagging the security technology for failing to prevent the action; and
generating the prompt to adjust sensitivity of the security technology to autonomously execute prevention actions responsive to behaviors analogous to the action on the computer network.

22. A method for verifying configurations of security technologies deployed on a computer network comprising:
deploying a phase, within an attack validation scenario analogous to a network security threat, to a target asset on the network, the phase and associated with a polling window and a target response type and executed by the target asset during a phase window;

at the target asset, executing an action according to the phase during the phase window, the action associated with the target response type; and during the polling window following the phase window:
  pooling the sequence of events written to the log of the security technology and published to an alert feed by the security technology during the polling window; and calculating correlation scores for events, in the sequence of events, comprising calculating correlation scores for events, in the sequence of events, representing the action executed by the target asset during the phase window based on proximities of timestamps of events, in the sequence of events, to the phase window; in response to a first correlation score of a first event, in the sequence of events, exceeding a threshold score:
    selecting the first event in response to the first correlation score of the first event exceeding correlation scores of each other event in the sequence of events; and
    confirming logging of the phase by the security technology in response to the first correlation score of the first event exceeding the threshold score; and
  in response to a difference between a first event type of the first event and the target response type of the phase:
    flagging the security technology for failing to alert on the action; and
    generating the prompt to adjust sensitivity of the security technology to publish alerts, in place of prevention actions, responsive to behaviors analogous to the action on the computer network.

* * * * *